Figure 2:
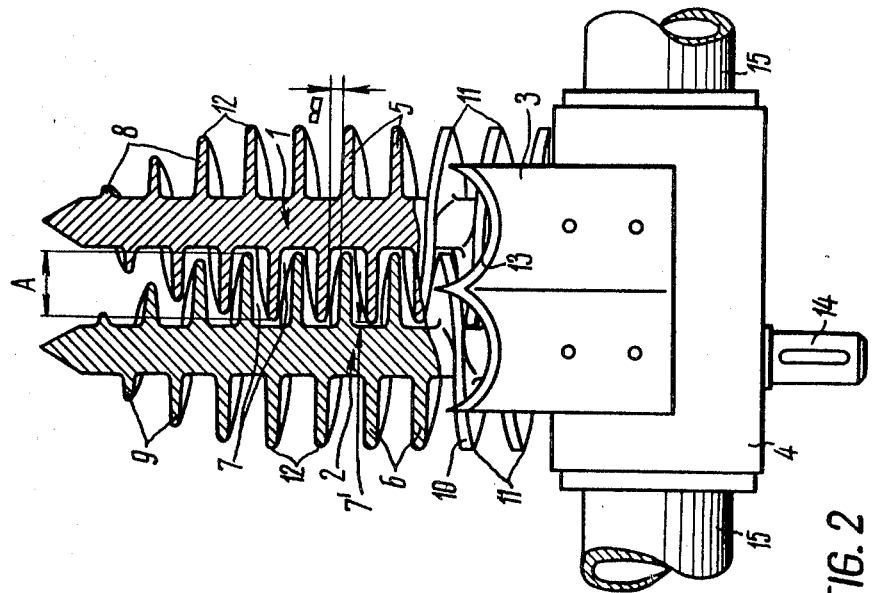

United States Patent

[11] 3,603,363

[72] Inventor Boris Moiseevich Frankshtein
ulitsa Yablochkova, 31, kv. 44, Moscow, U.S.S.R.
[21] Appl. No. 815,667
[22] Filed Apr. 14, 1969
[45] Patented Sept. 7, 1971

[54] ROOT CROP HAULM CUTTER
4 Claims, 2 Drawing Figs.
[52] U.S. Cl. ........................ 146/85
[51] Int. Cl. ........................ A23n 15/04
[50] Field of Search .......................... 146/83, 85; 171/36, 39, 41; 56/101

[56] References Cited
UNITED STATES PATENTS
2,102,379 12/1937 Nutter .................. 171/36 X
2,288,915 7/1942 Morral et al. ................ 56/101 X
2,357,810 9/1944 Christiansen .................. 171/36

Primary Examiner—Willie G. Abercrombie
Attorney—Waters, Roditi, Schwartz & Nissen ABSTRACT: A root crop haulm cutter comprises a body carrying a pair of augers for rotation in opposite directions with the blades of the augers overlapped and interpenetrated with one another with clearance. A knife is fixed on the body and extends into adjacent relation with the augers at the outer periphery of the blades and the knife has a cutting edge confronting the augers and curved to conform to the outer periphery of the blades so as to extend in adjoining circumferential relation therewith.

ROOT CROP HAULM CUTTER

The present invention relates to agricultural implements serving to harvest root crops in field conditions and, more particularly, to root crop haulm cutters.

Presently known in the art are root crop haulm cutters incorporating a pair of counterrotating augers and a rotating disc knife, each auger being fitted with two supports, one on the side where the haulm enters the machine and the other on the side of the auger drive (cf. German Pat. No. 696,247, class 45c, group 18 02, 1940).

In the known cutters flat knives are installed under the pair of augers, and the screw blades of the latter overlap with each other to a negligible extent or do not overlap at all. Due to this, a deep recess is developed below between the augers along with a substantial clearance between the external surface of the pair of augers and the blade of the flat knife, a root head entering said clearance when root crops are dragged to the augers. Thus, in the known cutters the haulm is cut together with the head of the root.

Additionally, such a design of the known cutters inevitably causes jamming of root heads and haulm in the space between the flat knife and the augers.

The auger supports disposed on the side of the haulm entry hamper its passage to the cutter.

Also, in the known cutters, due to the fact that the blades of the first auger overlap negligibly with those of the second auger, the space between these augers is not sufficient for the passage of large bundles of haulm or haulm of several closely situated root crops. For this reason, the known cutters are very sensitive to the size of the haulm bundles and cannot operate when the flow of the root crops is dense.

The above reasons make the known cutters unreliable in operation when they are employed in beet harvesters.

An object of the present invention is to provide such a root crop haulm cutter which is highly efficient and provides cutting of the haulm near the heads of root crops, without damaging the root crop.

The present invention relates to farm implements for harvesting root crops and more particularly to a root crop haulm cutter.

Presently known in the art are root crop haulm cutters comprising a pair of rotating augers and a rotating disc knife, whereas each auger of the pair has two supports.

For this reason, the known cutters are very sensitive to the sizes of haulm bundles and cannot operate when the root crops are thick.

The above reasons make the known cutters unreliable in operation when they are employed in beet harvesters.

In the accomplishment of the above and other objects in a root crop haulm cutter comprising a pair of counter rotating augers and a knife, according to the invention, the augers have free open ends and are mounted on the body so that the screw blades of one overlap with some clearance those of the other, the knife being rigidly fixed on the body, while the cutting edge thereof is bent along the outer surface of the pair of augers and adjoins this outer surface.

Such a design of the cutter eliminates the clearance between the knife and the outer surface of the augers and precludes, the possibility of damaging the root crop head by the knife and of jamming the space above the knife with plant waste.

It is appropriate to make the root crop haulm cutter such that the blades of one auger overlap with those of the other by a value greater than the clearance between the nearest surfaces of the blades of the coupled augers.

Due to this the recess between the augers of the pair is not deep and passage of the root towards the augers terminates before the root head contacts the surface of the rotating augers. This prevents the root heads from being damaged by the screw blades of the augers.

Additionally, it is appropriate to provide sharp edges for the screw blades of the augers adjoining the cutting edge of the immovable knife whereas the blade edges throughout the remaining length of the augers should smoothly blend into a rounded or oval shape.

The oval shape of the edges of the auger screw blades at the zone of haulm entry and dragging of root crops makes it possible to decrease the distance between the root head and the plane of cutting the haulm and ensures better levelling of the root crops as to the height of their heads prior to the haulm cutting. Sharp edges of the auger blades at the zone where they slide along the cutting edge of the immovable knife during the augers' rotation facilitates the process of haulm cutting between the two adjoining and mutually sliding edges of which belongs to the immovable knife and the other to the rotating screw blades of the augers.

The cutting edge of the immovable knife can be made biconcave in the direction of the auger axes.

The cutting edge of the immovable knife having a biconcave shape curved in the direction of the auger axes makes it possible to increase the length of those sectors of the auger blades which, during the rotation of the augers, slide along the cutting edge of the immovable knife, and, therefore, participate in the process of haulm cutting. Thanks to this, the load on each point of the sharp edges of the auger blades is decreased and substantially prolongs the service life of the cutter prior to repair.

Such a design of the root crop haulm cutter makes it possible to employ the same in root crop harvesters to harvest table root crops, as to well as harvest commercial quality products without resorting to manual labor.

Figure 1:
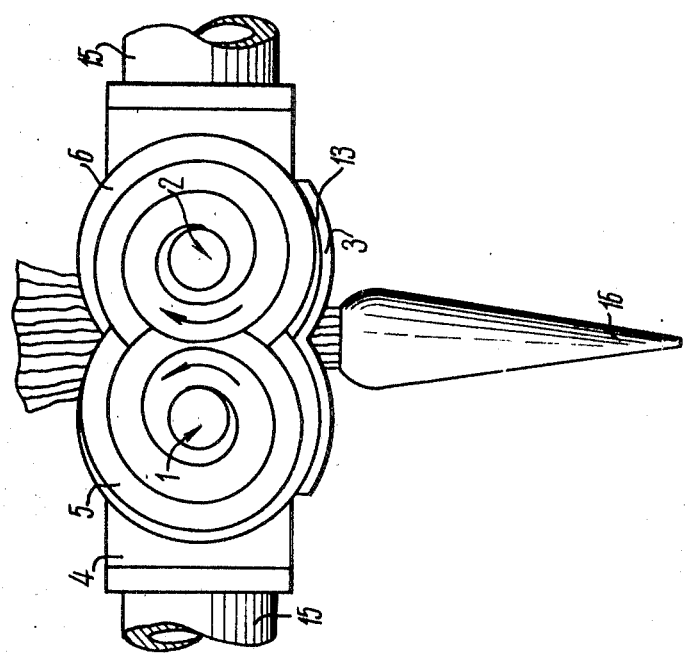

A preferred embodiment of the invention is described hereinbelow by way of example, reference being made to the accompanying drawings, wherein:

FIG. 1 is a front view of a root crop haulm cutter, according to the invention; and FIG. 2 is a bottom view of the same cutter with the augers partly in section part view of the augers.

The root crop haulm cutter comprises: augers 1 and 2 (FIGS. 1 and 2), knife 3 and body 4.

Augers 1 and 2 make up a pair of augers open end mounted on body 4. The auger shafts are mounted in four radial bearings disposed inside body 4 (not shown in the drawing).

Synchronization of the counterrotation of the pair of augers at the moment of the cutter's operation is effected with the help of a pair of gears likewise disposed inside the body (not shown in the drawing).

Auger 1 has screw blades 5 of right-hand thread direction, and auger 2 has screw blades 6 of left-hand thread direction. The shafts of auger 1 and 2 are arranged parallel to each other and the distance between them is chosen so that screw blades 5 of auger 1 partially enter between the screw blades 6 of auger 2 and vice versa, cross clearances 7 (FIG. 2) being developed with regard to fulcrums of the augers between blades 5 of auger 1 and blades 6 of auger 2, and clearance 7' of minimum value being developed between the end face surfaces of screw blades 5 and 6.

Additionally, screw blades 5 of auger 1 overlap screw blades 6 of auger 2 by a value A which is greater than value B corresponding to clearance 7.

The front part of the cutter turns 8 and 9 of respective screw blades 5 and 6 (FIGS. 1 and 2) gradually become smaller in the direction counter to the movement of root crops and finally disappear. Screw blades 5 and 6 (FIG. 2) have different shapes of external ribs 10 along the length of respective augers 1 and 2. Blades 5 and 6 near body 4 have external ribs 10 with sharp edges 11 which, throughout the remaining length of augers 1 and 2, are rounded at 12, the shape of external ribs 10 with sharp edges 11 gradually being rounded.

Rigidly fixed on body 4 (FIG. 2) is knife 3. A cutting edge 13 (FIGS. 1 and 2) of the knife is curved along the outer surface of the pair of augers and adjoins it.

Cutting edge 13 of immovable knife 3 (FIG. 2) has a biconcave shape in the direction of the auger axes with a projection in the middle of the pair of augers.

Various embodiments of cutting edge 13 of knife 3 with respect to its shape may be possible. However, all these should respect the following condition: cutting edge 13 of knife 3 should be elongated in the direction of fulcrums of augers 1 and 2. In this case, the cutting of haulm is effected by a longer part of external ribs 10 with sharp cutting edges 11. This prolongs the service life of augers 1 and 2.

It is preferred that the clearance between cutting edge 13 of knife 3 and sharp edges 11 of augers 1 and 2 be minimum as to the running fit. Auger 2 (FIG. 2) is fitted with a shaft 14 of an elongated shape which extends outside body 4 and serves as a driving shaft. Body 4 is fixed on frame 15 of the root crop harvester (not shown in the drawing).

The present root crop haulm cutter operates in the following manner.

Counterrotating augers 1 and 2 (FIG. 1) catch the haulm of dug-out root crops which then enters the cutter via clearances 7. The heads of the root crops can be positioned at a different height with regard to the coupled augers. Augers 1 and 2 rotating counter to each other, the haulm travels in clearances 7 towards immovable knife 3, the root crops being dragged to the augers and the roots being levelled as to their height.

The cutting of the haulm is effected when sharp edges 11 of screw blades 5 and 6 of the pair of augers travel along cutting edge 13 of knife 3.

Having been cut off, the haulm is thrown by the augers upwards and to the sides, whereas the root crop falls onto a receiver or moving conveyor of the root crop harvester. Jamming of the augers with plant waste does not take place since the screw blades self clean the clearances 7 of the pair of augers during the rotation of the latter.

I claim:

1. A root crop haulm cutter comprising a body, a pair of augers with helical blades thereon, said augers being mounted on said body for undergoing opposite directions of rotation and being spaced from one another such that the blades overlap and interpenetrate one another with clearance, a knife fixed on said body and extending into adjacent relation with said augers at the outer periphery of said blades thereof, said knife having a cutting edge confronting the said augers and being curved to conform to the outer periphery of said blades to extend in adjoining circumferential relation therewith.

2. A cutter as claimed in claim 1 wherein said blades of the augers overlap one another by an amount substantially greater than the clearance between interpenetrated blades.

3. A cutter as claimed in claim 1 wherein said blades of the augers adjacent the cutting edge of the blade have sharp edges whereas the edges of the blades throughout the remaining length of the augers are rounded.

4. A cutter as claimed in claim 1 wherein said cutting edge has two concave portions in the axial direction of the augers each for a respective blade.